Herriott & Myers,

Balanced Valve.

No. 4,117. Reissued Sept. 13. 1870.

Witnesses.

A. C. Johnston
James S. Johnston.

Inventors

Thomas M. Herriott
Samuel Myers

N. PETERS, PHOTO-LITHOGRAPHER, WASHINGTON, D. C.

United States Patent Office.

THOMAS M. HERRIOTT AND SAMUEL MYERS, OF SOUTH PITTSBURG, PENNSYLVANIA.

*Letters Patent No.* 84,278, *dated November* 24, 1868; *reissue No.* 4,117, *dated September* 13, 1870.

IMPROVEMENT IN BALANCE SLIDE-VALVES.

The Schedule referred to in these Letters Patent and making part of the same.

*To all whom it may concern:*

Be it known that we, THOMAS M. HERRIOTT and SAMUEL MYERS, of South Pittsburg, in the county of Allegheny and State of Pennsylvania, have invented a certain new and useful Improvement in the Construction of "Balance Slide-Valves" for Steam-Engines; and we do hereby declare that the following is a full and exact description thereof, reference being had to the accompanying drawing and to the letters of reference marked thereon.

Our invention relates to that class of valves in which it is sought, by various arrangements, to shut off the working-pressure from a sufficient area on the top of the valve to substantially "balance it."

In the accompanying drawing—

In all the figures the same letters indicate the same parts.

The working-face of our valve is not different from those of ordinary use, and is not shown except in section, (fig. 2,) *o* being the usual exhaust-passage.

Figure 1:
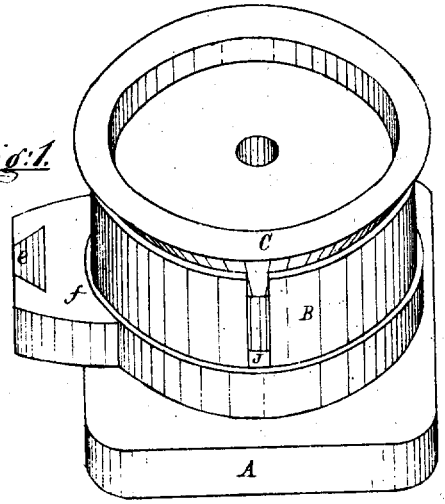
Figure 1 is a perspective view of our improvement in slide-valves.
Figure 2:
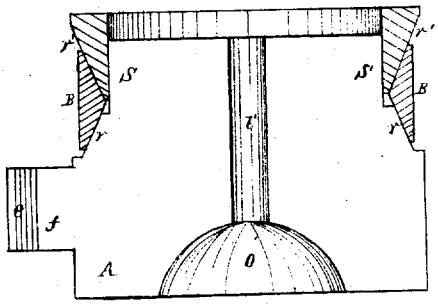
Figure 2 is a vertical section of the same.
Figure 4:
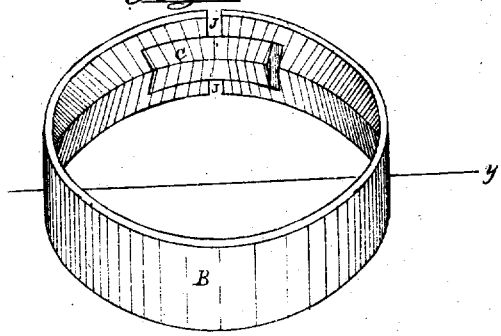
Figure 4 is a perspective view of the compressing-ring.

The parts which involve our invention are, the cylindrical elevation or projection S, figs. 1 and 2, the packing-ring C, figs. 1, 2, and 4, and the spring-ring B, figs. 1, 2, 5, and 6.

*e* and *f* are a projection and slat for connecting the valve-rod, and form no part of our invention.

The projection S rises at right angles with the face of the valve, so as to come within, say, one-sixteenth inch of the cap of the steam-chest.

Its diameter should be such that, together with C, it will present a horizontal area nearly equal to the face of the valve.

The shoulder *r*, at the base of S, is beveled at an angle of about sixty degrees' elevation, and the outside of the packing-ring has an equal inclination, as shown at *r'*.

The ring C should fit so as to move freely on the cylindrical elevation S.

The inside of the spring-ring B is beveled to correspond with the inclination of *r* and *r'*, between which it fits, the surfaces in contact being ground steam-tight.

The least inner diameter of B should be sufficient to allow it to close concentrically as far as the cut J J will permit.

Figure 5:
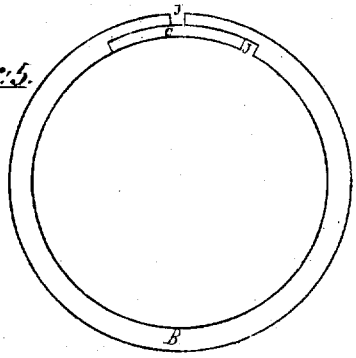
Figure 5 is a transverse section of the compressing-ring, cut through at line *y* of fig. 4.
Figure 3:
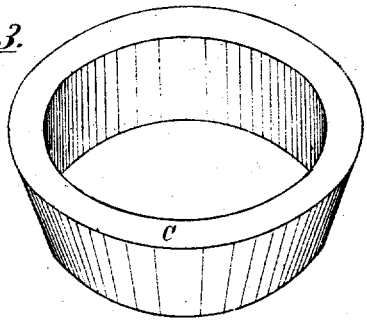
Figure 3 is a perspective view of the packing-ring.

This cut will vary in different valves, according to their size and extent of movement, and is closed against the passage of steam by the tongue *c'*, which is attached to one end of the ring by rivet *x*, and laps over the inside of the other end, as shown at J, figs. 5 and 6, the bevels at *r* and *r'* being of sufficient width to lap over the tongue, and thus no steam is admitted to pass through the cuts J J'.

The proper vertical width of B is determined by the horizontal area of that part of C which is in contact with the cap of the steam-chest, and by the bevels of the angles *r r'*. All these angles being, say, for comparison and illustration, forty-five degrees from a horizontal line, the width of B should be such that its total area be slightly greater than twice the area of the upper surface of C, and, in proportion as the angles *r r'* and the angle inside B are more obtuse, the area of its external surface must be increased, so that the concentric movement of B will be less than the vertical movement of C, in proportion as the area of C is less than one-half the total area of B, always giving a slight margin of excess to the area of B, so as to always insure it (B) a slight excess of leverage as against C.

From these data any competent mechanic can determine the relative proportions of any required valve.

The hole *i* through the body of the valve, from the top to the exhaust-passage, is intended to instantly relieve any pressure which might otherwise, through leakage of the parts, or from other cause, accumulate on the top of the valve.

All its parts being thus constructed and arranged, as shown in figs. 2 and 1, our valve is complete and ready for use in a suitable steam-chest, and its operation is as follows, (the ring C being held in slight contact with the cap of the steam-chest by the elastic force of the ring B before steam is admitted:)

When steam is admitted to the chest, its pressure on the outside of B tends to close it concentrically, and thus force upward C, and maintain it in steam-tight contact with the cap of the chest, thus cutting off steam communication with the top of the valve, and establishing almost complete equilibrium of pressure upon both sides of the valve, and securing the well-known advantages of "balanced valve."

If the valve should wear by usage, the steam-pressure on B will render it effective.

In addition to its advantages as regards efficiency, our valve has the further one of very great simplicity and economy in its primary construction.

Having thus described the nature, construction and operation of our improvement,

What we claim as of our invention is—

The ring B, beveled upon its inner surface, for the purpose of raising and pressing the upper face of a slide-valve against the valve-chamber, cap, or cover by the lateral exterior pressure of steam, substantially as hereinbefore set forth.

THOMAS M. HERRIOTT.
SAMUEL MYERS.

Witnesses:
A. C. JOHNSTON,
JAMES J. JOHNSTON.